(12) United States Patent
Schulz

(10) Patent No.: US 6,762,403 B2
(45) Date of Patent: Jul. 13, 2004

(54) ACTINOMETRIC MONITOR FOR MEASURING IRRADIANCE IN ULTRAVIOLET LIGHT REACTORS

(76) Inventor: Christopher R. Schulz, 20795 E. Fair Pl., Aurora, CO (US) 80016

( * ) Notice: Subject to any disclaimer, the term of this patent is extended or adjusted under 35 U.S.C. 154(b) by 137 days.

(21) Appl. No.: 10/154,983

(22) Filed: May 24, 2002

(65) Prior Publication Data

US 2003/0218128 A1 Nov. 27, 2003

(51) Int. Cl.⁷ .................................................. G01J 1/50
(52) U.S. Cl. .................................. 250/252.1; 250/474.1
(58) Field of Search ........................... 250/252.1, 472.1, 250/473.1, 474.1

(56) References Cited

U.S. PATENT DOCUMENTS 6,596,542 B1 * 7/2003 Schulz ........................ 436/1

* cited by examiner

Primary Examiner—Constantine Hannaher
Assistant Examiner—Timothy Moran
(74) Attorney, Agent, or Firm—Alfred J. Mangels

(57) ABSTRACT

A tubular holder for an actinometric monitoring element for monitoring the irradiance of ultraviolet light within a liquid to be treated for microorganism control. The holder extends into the interior of a vessel or a pipeline that carries a fluid to be treated by exposure to ultraviolet light. A transparent end cap is carried at the end of the holder that is within the vessel or pipeline. Positioned within the holder is an actinometric monitoring element that can be either a transparent container for an actinometric solution or a photocell, each for sensing the irradiance of ultraviolet light emitted by light sources positioned within the vessel or pipeline. The holder is removably received in a sleeve that extends through the wall of the vessel or pipeline.

17 Claims, 5 Drawing Sheets

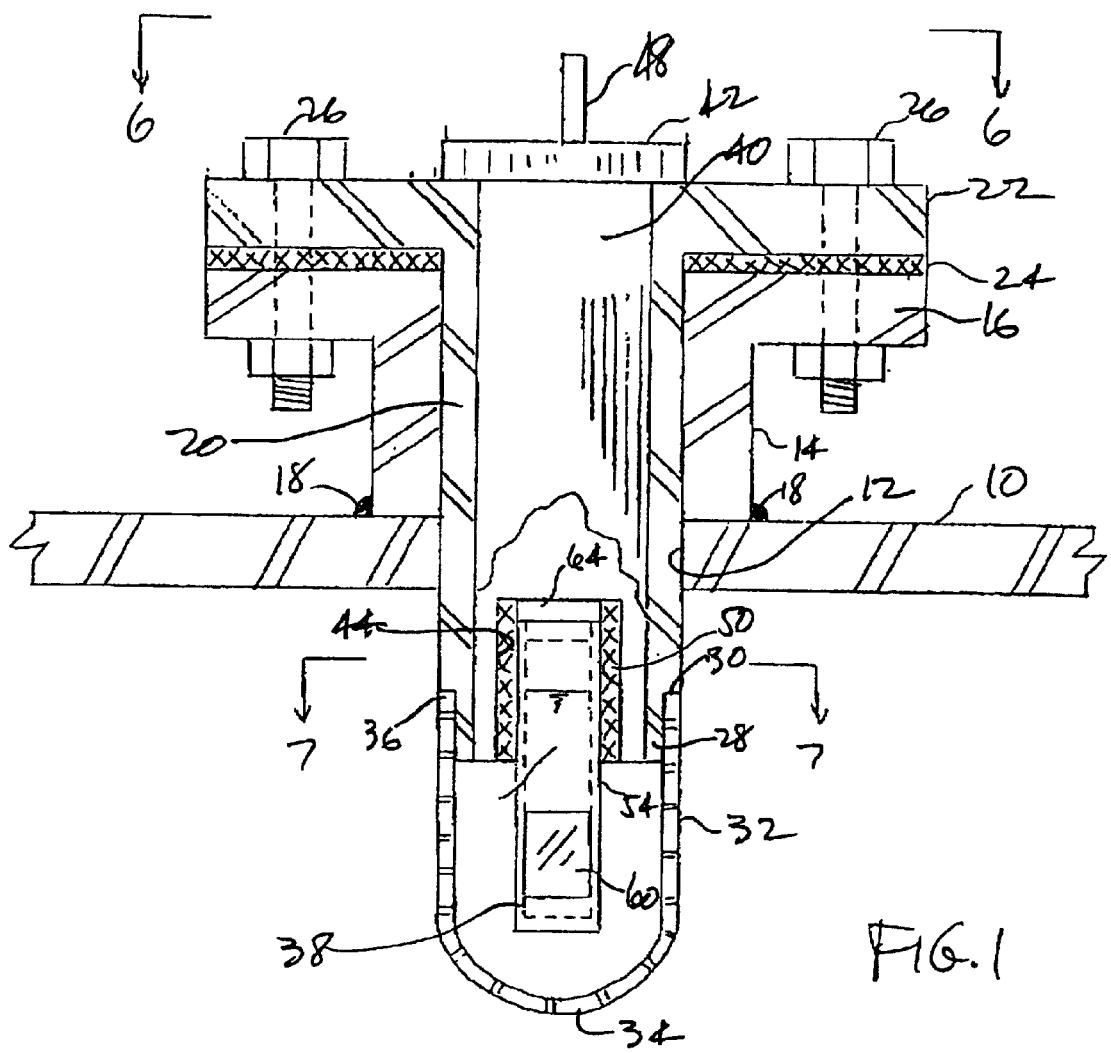
FIG. 1
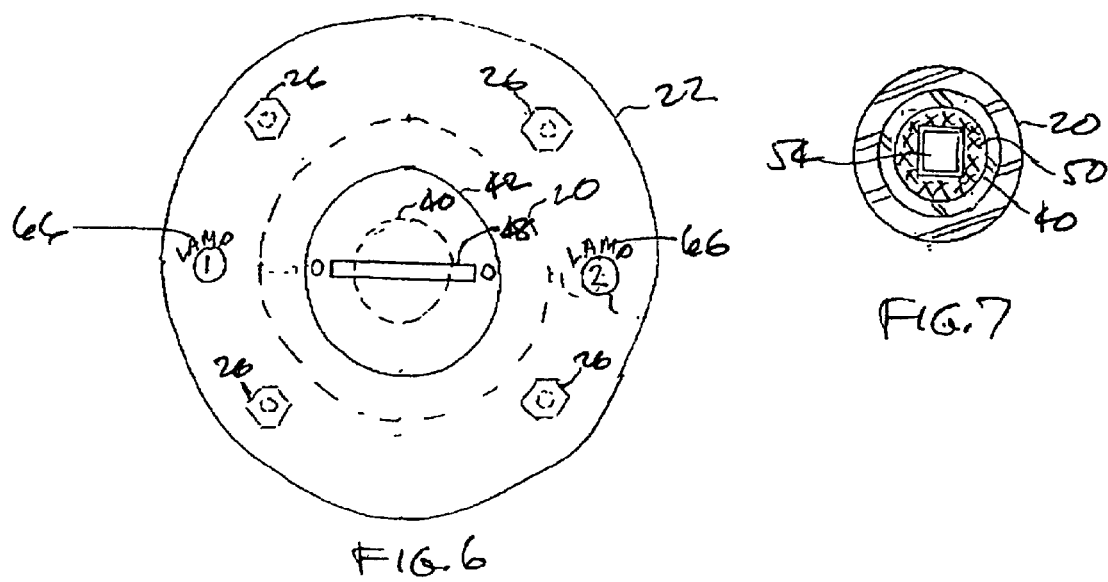
FIG. 6
FIG. 7

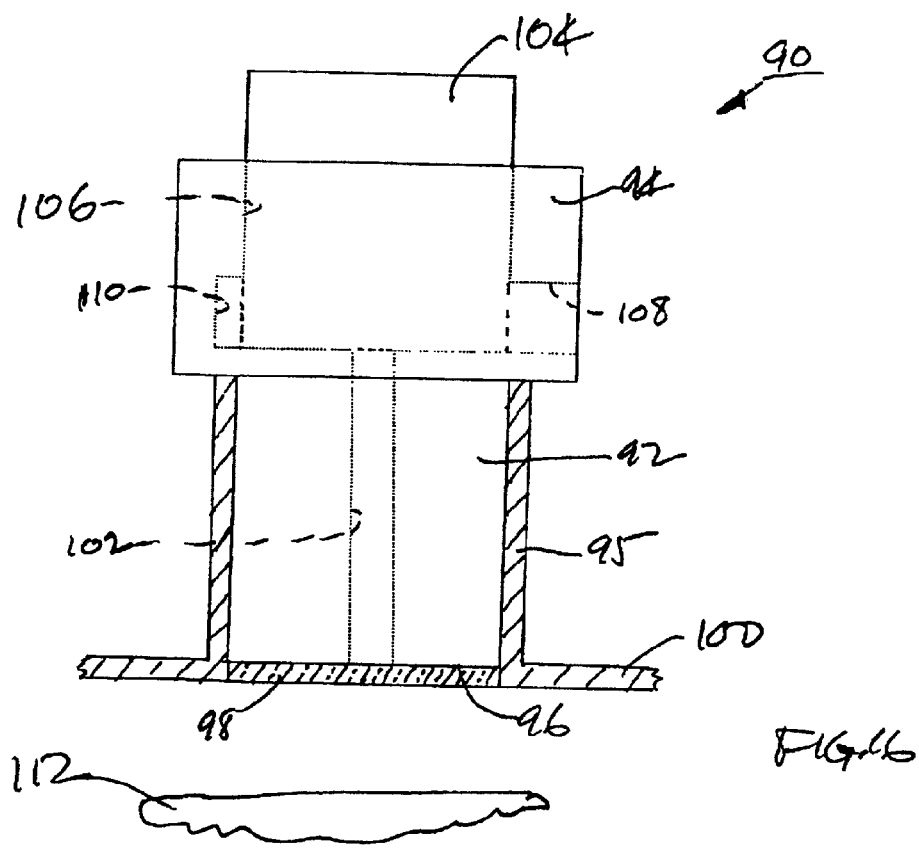
FIG. 16
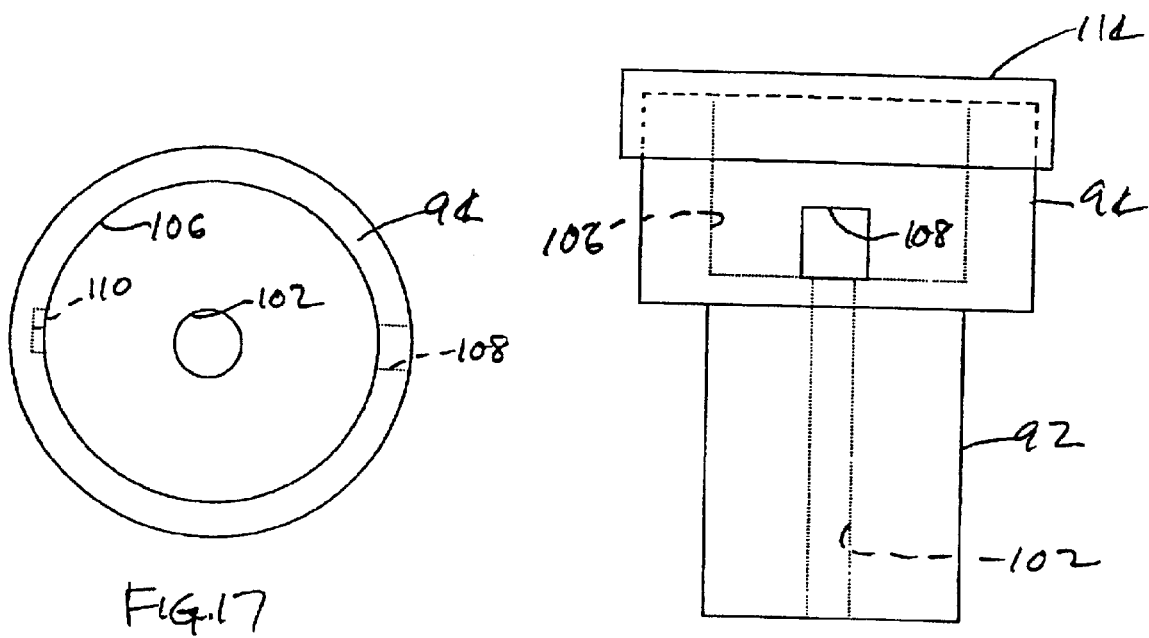
FIG. 17
FIG. 18

US 6,762,403 B2

ACTINOMETRIC MONITOR FOR MEASURING IRRADIANCE IN ULTRAVIOLET LIGHT REACTORS

BACKGROUND OF THE INVENTION

1. Field of the Invention

The present invention relates to a monitor for measuring ultraviolet irradiance in a reactor vessel or in a conduit within which an ultraviolet light source is positioned for irradiating a liquid. More particularly, the present invention relates to an actinometric monitor that is removably supported at the wall of a flow conduit that contains a flowing liquid that is irradiated by ultraviolet light, or at the wall of a vessel that contains a liquid that is irradiated by ultraviolet light.

2. Description of the Related Art

Water disinfection reactors having ultraviolet light sources disposed within the water to be disinfected have been known for some time. The ultraviolet light deactivates pathogenic microorganisms without producing residuals or hazardous byproducts, and it avoids the need to use hazardous disinfection chemicals.

Generally, the output of ultraviolet lamps utilized in disinfection reactors diminishes gradually over time. Such diminution results from aging of the lamps and also from blockage of the light by deposits on the surfaces of the lamp housings. The deposits are typically dissolved minerals in the water that adhere to the surfaces of the quartz tubes or sleeves within which the ultraviolet lamps are usually housed, and the deposits either physically block the light path or they absorb ultraviolet light. As a consequence, the effectiveness of the disinfection process must be monitored by periodically determining the amount of ultraviolet light that actually passes through the water being treated.

Typically, ultraviolet-light-based disinfection reactors are equipped with photocells that are sensitive to ultraviolet light. The photocells measure relative changes in the ultraviolet fluence rate (or irradiance) within the flowing water. Changes in ultraviolet irradiance patterns in the reactor because of lamp aging, buildup of light-blocking deposits on the surfaces of the quartz sleeves, or changes in the ultraviolet transmittance of the fluid being irradiated, can be sensed by the photocells. But the photocells only indicate relative values of ultraviolet light irradiance at a particular location in a disinfection reactor.

In addition to their inability to directly determine the absolute value of the ultraviolet-light dose to which the water is subjected at a particular location within the reactor, the sensitivity of photocells decreases with use. Such decreases are caused by surface damage from ultraviolet light radiation and also by aging of the photocells. Accordingly, recalibration of the photocells is required at regular intervals, to assure that they can be relied upon to accurately monitor changes in the irradiance output from the ultraviolet light sources. Typically, the photocell sensors must be removed from the reactor and recalibrated by the manufacturer using a radiometer, which is a time-consuming and expensive procedure.

It is therefore an object of the present invention to provide an actinometer-based ultraviolet monitor that can measure the actual exposure of a liquid to ultraviolet light at a particular location in an ultraviolet light reactor vessel or conduit, and to provide a simple and inexpensive means to recalibrate photocell sensors, thus overcoming the deficiencies and limitations of the previous techniques.

SUMMARY OF THE INVENTION

Briefly stated, in accordance with one aspect of the present invention, an actinometric monitor is provided for measuring ultraviolet irradiance in a water disinfection ultraviolet reactor that includes an interiorly-positioned ultraviolet light source. The monitor includes a holder for selectively receiving one of a photocell-based ultraviolet light sensor having a surface positioned at a predetermined distance from the light source and an actinometric-solution-based ultraviolet light sensor having a surface positioned from the light source at the predetermined distance. The holder is adapted to be removably positioned in a holder sleeve extending outwardly from a wall of the reactor. A window that is substantially transparent to ultraviolet light is positioned between the light source and the holder to prevent contact between the holder and liquid to be treated by exposure to ultraviolet light within the reactor. A recess is provided in the holder and is positioned at a predetermined distance from the light source for removably receiving an actinometric-solution-containing cuvette.

BRIEF DESCRIPTION OF THE DRAWINGS

FIG. 1 is a fragmentary, longitudinal cross-sectional view through an actinometric monitor in accordance with the present invention, as positioned in a wall of a vessel.

FIG. 6 is a top view taken along the line 6—6 of FIG. 1.

FIG. 7 is a cross-sectional view taken along the line 7—7 of FIG. 1.

FIG. 16 is a fragmentary, elevational view, partially in section, of another embodiment of an actinometric monitor in accordance with the present invention, as positioned at a wall of a vessel and including a photocell sensor.

FIG. 17 is a top view of the actinometric monitor shown in FIG. 16, but without the photocell sensor.

FIG. 18 is a right side elevational view of the actinometric monitor shown in FIG. 16 including a cover and without the photocell sensor.

DESCRIPTION OF THE PREFERRED EMBODIMENTS

Figure 2:
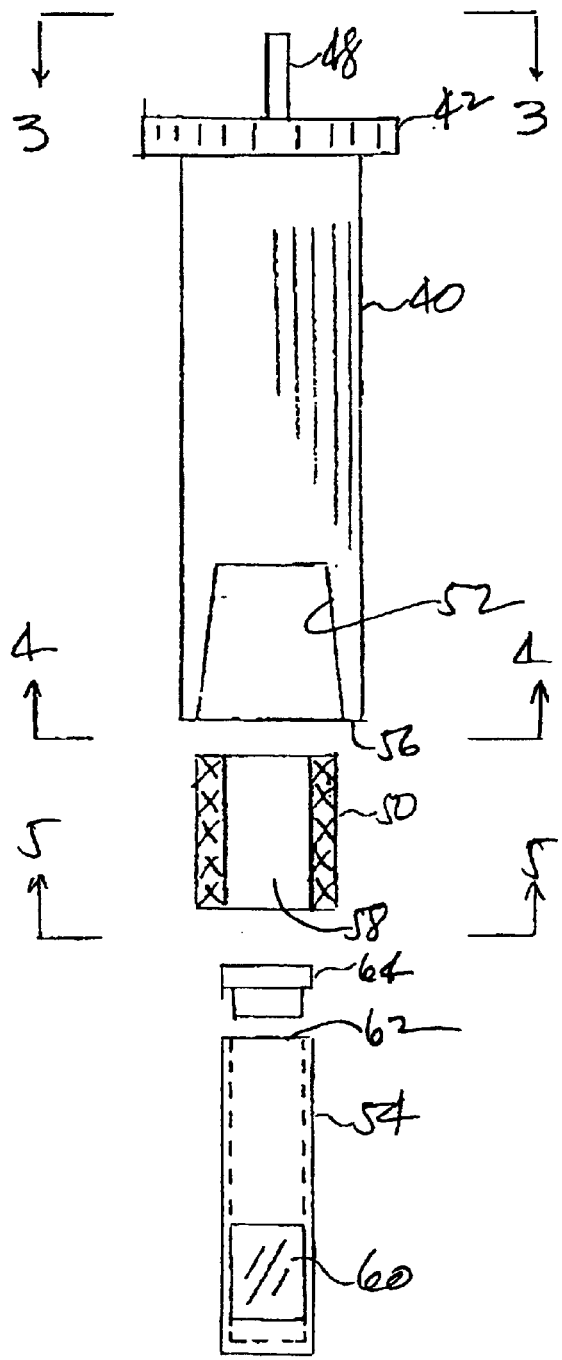
FIG. 2 is an exploded elevational view of a holder portion of the actinometric monitor shown in FIG. 1.
Figure 3:
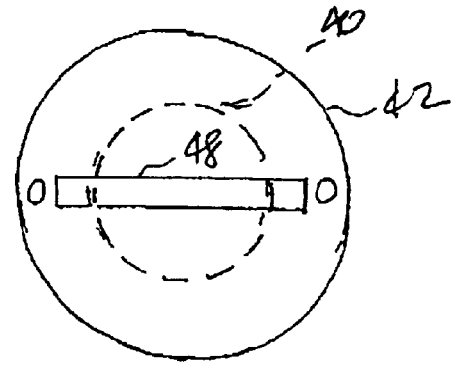
FIG. 3 is a view taken along the line 3—3 of FIG. 2.

Referring to the drawings, and particularly to FIG. 1 thereof, there is shown a fragmentary portion of a wall 10 of a reactor vessel within which a liquid (not shown) is exposed to ultraviolet light that emanates from a light source (not shown). The reactor vessel can be in the form of a closed container, or it can be a tubular conduit through which the liquid is adapted to flow as it is exposed to the light from light sources positioned within the vessel. The liquid can be water that is to be disinfected by exposure to ultraviolet light.

Wall 10 includes an opening 12 about which is positioned an outwardly-extending tubular member 14 that includes at its outermost end a radially-outwardly-extending end flange 16. Tubular member 14 can be welded to wall 10, such as by weld 18, to provide a liquid-tight connection therebetween. A holder sleeve 20 is axially slidably carried within tubular member 14 to extend partially through wall 10 and into the interior of the reactor vessel a predetermined distance. Holder sleeve 20 includes at its outer end a radially-outwardly-extending flange 22 that is adapted to substantially overlie end flange 16. A sealing gasket 24 is provided between flanges 16 and 22 to prevent leakage of liquid from within the reactor vessel. Additionally, a plurality of circularly-disposed connecting bolts 26 are provided to hold flanges 16 and 22 together and to sufficiently compress sealing gasket 24 to block possible leakage flow from within the reactor.

The portion of holder sleeve 20 that is within the reactor includes a reduced wall thickness extension 28 that defines an external peripheral step 30. A tubular end cap 32 is provided having a closed end 34 facing inwardly into the interior of the reactor, and an open end 36 that is carried at and sealingly engages with the inner end of holder sleeve 20, to overlie extension 28 and to terminate at and engage with step 30. End cap 32 is a transparent element that allows ultraviolet light to pass therethrough to impinge upon an actinometric sensing element 38 that is carried within holder sleeve 20. Preferably, end cap 32 is a relatively thin-walled quartz structure to allow maximum transmission of ultraviolet light to pass therethrough to impinge against and to be sensed by actinometric sensing element 38.

A sensing element holder 40 is axially slidably received within holder sleeve 20 and is adapted to carry actinometric sensing element 38. The outermost end of sensing element holder 40 includes a radially-outwardly-extending flange or shoulder 42 to overlie at least a portion of the end surface of flange 22 to limit inward movement of holder 40 relative to wall 10. In the embodiment shown in FIG. 1, holder 40 includes at its innermost end an inwardly-extending recess or opening 44 to receive actinometric sensing element 38, which as shown in that Figure is in the form of a tubular container for an actinometric solution. Holder 40 can also include a tab or gripping member 48 to facilitate removal of holder 40 from sleeve 20.

Figure 4:
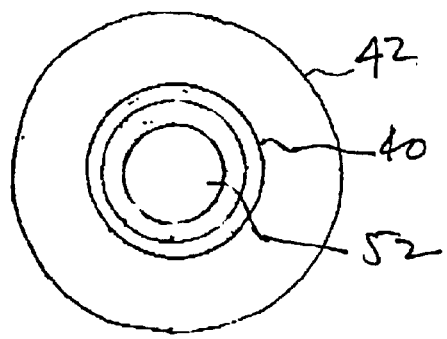
FIG. 4 is a view taken along the line 4—4 of FIG. 2.
Figure 5:
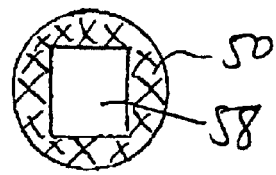
FIG. 5 is a view taken along the line 5—5 of FIG. 2.

FIG. 2 shows in an exploded view sensor holder 40 and associated actinometric sensor components. Holder 40 carries a flexible sleeve 50 that is adapted to be removably received in recess 44 provided at the innermost end of holder 40, and a tubular container 54 that is adapted to be at least partially received within and retained by flexible sleeve 50. As shown, recess 44 in holder 40 is inwardly tapered to provide a narrowed cross-sectional area interiorly of holder outer end 56. That arrangement allows flexible sleeve 50 to engage the wall of recess 44 and thereby be frictionally retained within the recess when the sleeve is pressed into the recess. In that regard, the outer surface of flexible sleeve 50 can be of cylindrical cross section, as shown in FIG. 5, and tapered recess 44 can be of circular cross section, as shown in FIG. 4. However, other cross-sectional shapes can also be employed for recess 44 and sleeve 50, if desired. Additionally, in order to frictionally engage the outer surface of tubular container 54, sleeve 50 can be made from any suitable flexible material that is also resilient, such as rubber, elastomer, and the like.

Tubular container 54 can be a standard laboratory quartz cuvette having a substantially square cross section, and is adapted to be received within the correspondingly-shaped inner open area 58 of sleeve 50, as shown in FIGS. 2 and 5. A cuvette having a 1 cm path length can readily be accommodated in a standard spectrophotometer for purposes of chemical analysis of an actinometric solution that is carried within the cuvette. Container 54 has an opaque, external coating or cover on all outer surfaces, except for an ultraviolet-transparent window 60 provided on two opposed outer faces of the container, to allow ultraviolet light to pass through the container wall and impinge upon the actinometric solution within the container. Windows 60, only one of which is shown in FIG. 1, can have a rectangular shape, as shown, and has a predetermined area, such as about 0.75 $cm^2$. Windows 60 can be formed by omitting the opaque external coating or cover at predetermined areas on opposite sides of the container, to define two opposed openings in the coating or covering material. An opening 62 is provided in container 54 for introducing the actinometric solution into the container, and the container is closed by attaching or inserting a suitable closure 64, which can be, for example, a plug closure, a threaded closure, or the like.

As shown in FIG. 6, the top surface of flange 22 can include one or more markings, such as markings 66, to allow proper orientation of sensing element holder 40 relative to the interiorly-positioned light sources (not shown). The orientation of holder 40 should be so arranged that during installation of holder 40 in sleeve 20, windows 60 in container 54 each face in a direction to receive light from a light source (not shown) that is provided within the reactor. In that regard, holder 40 can be configured so that the outer faces of windows 60 are positioned in a predetermined relationship with the longitudinal dimension of gripping member 48, which can be perpendicular or parallel, to facilitate proper orientation of windows 60 of container 54 relative to the light source.

An actinometric solution placed within container 54 can be a potassium iodide/iodate solution or a uridine solution. Those solutions are especially useful for measuring ultraviolet light doses in the germicidal treatment light band, which extends from a wavelength of from about 200 nm to about 300 nm. However, other actinometric chemical solutions can also be employed, if desired. A suitable sample solution that is reactive to ultraviolet light in the germicidal treatment range is 0.6 M iodide and 0.1 M iodate in 0.01 M borate buffer (pH 9.25), and can be prepared in accordance with information disclosed in a technical note entitled, "Potassium Iodide as a Chemical Actinometer for 254 nm Radiation: Use of Iodate as an Electron Scavenger," by Ronald O. Rahn, which was published in *Photochemistry and Photobiology*, 66, 450–455 (1997), the entire text of which is hereby incorporated herein by reference to the same extent as if fully rewritten. The difference between the absorbance of the actinometric solution before exposure to ultraviolet light and after exposure, as measured by a spectrophotometer, can be utilized to determine the incidence fluence (in mJ/cm$^2$) in accordance with the methods and equations provided in the Rahn technical note.

Figures 8, 9:
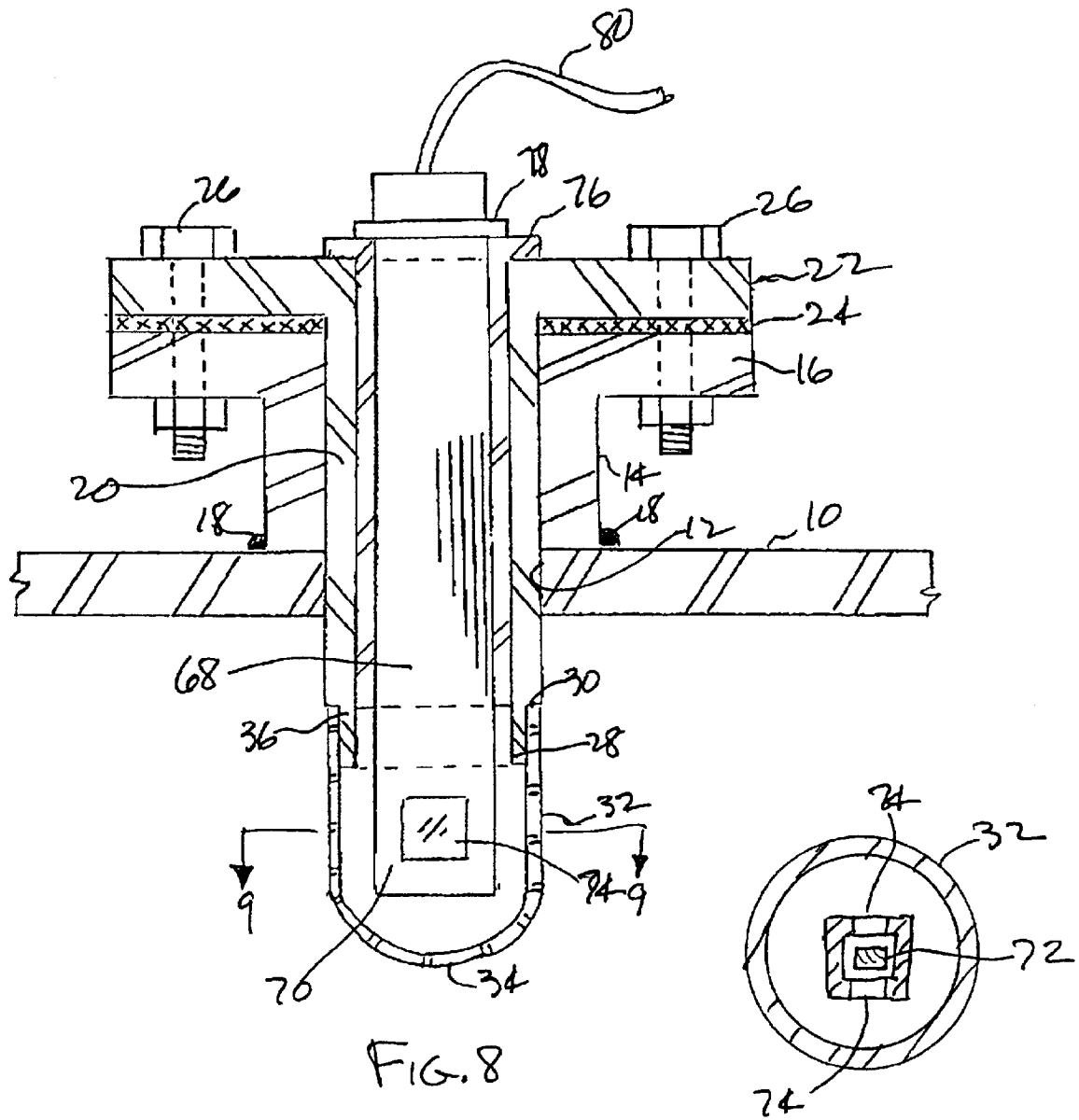
FIG. 8 is a fragmentary, longitudinal cross-sectional view through another embodiment of an actinometric monitor in accordance with the present invention, as positioned in a wall of a vessel.
FIG. 9 is a cross-sectional view taken along the line 9—9 of FIG. 8.

In addition to housing a solution-based actinometric monitor as shown in FIG. 1, holder sleeve 20 can also be utilized to house a photocell-based actinometric monitor 70. As shown in FIG. 8, sleeve 20 axially slidably receives a holder 68 that is structurally similar to that of holder 40, except that holder 68 carries adjacent its innermost end a photocell 72 (see FIG. 9) that is positioned behind a pair of opposed windows 74 that can be polished quartz, or the like. An optional, intermediate, flanged-end adapter sleeve 76 that is suitably sized can be provided to accommodate and center holder 68, if necessary because of size differences between holder sleeve 20 and holder 68.

Holder 68 includes a flange or shoulder 78 to engage the outer surface of flange 22 to limit inward movement of holder 68 relative to wall 10. A conductor 80 extends from photocell 72 for connection with a suitable sensing circuit to display or record photocell readings.

Figure 10:
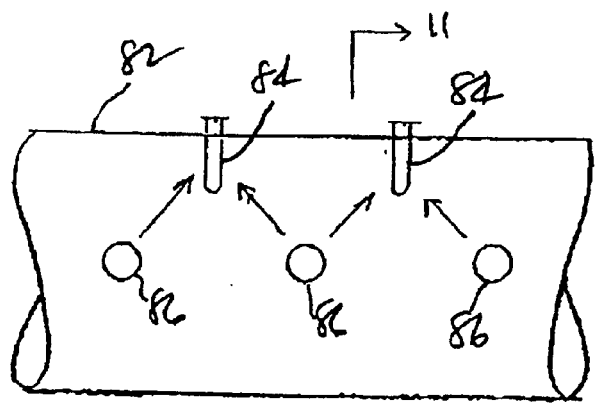
FIG. 10 is a fragmentary side view of a pipeline in which light sources and actinometric monitors are positioned to monitor the irradiance of a fluid passing through the pipeline.
Figure 11:
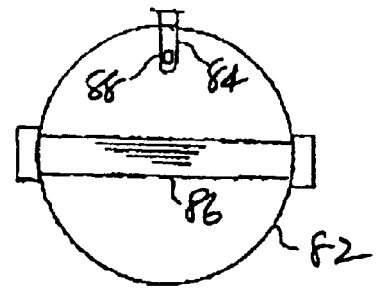
FIG. 11 is a cross-sectional view taken along the line 11—11 of FIG. 10.

The tubular actinometric monitor in accordance with the present invention can be disposed in different positions relative to the light sources within the vessel. In each instance, however, windows 60 and 74 are positioned within holder 20 so that they are opposite transparent end cap 32 and the same distance from the reactor wall to allow light to pass through the windows. For example, and for a vessel in the form of a pipeline 82, as shown in FIGS. 10 and 11, one or more actinometric monitors 84 of the type described herein can be positioned between respective parallel tubular light sources 86 that each extend transversely through the longitudinal centerline of pipeline 82 and are spaced from each other along the pipeline centerline at predetermined distances. Actinometric monitors 84 are positioned so that their axes pass through the pipeline centerline and are perpendicular to a plane in which the axes of tubular light sources 86 lie. The light from the respective light sources passes through the fluid to be treated by the light, and it then passes through windows 88 carried by actinometric monitors 84.

Figure 12:
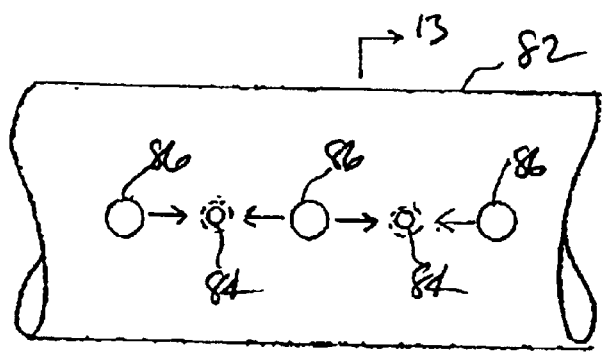
FIG. 12 is a fragmentary view similar to that of FIG. 10, showing another positional arrangement of actinometric monitors relative to the light sources.
Figure 13:
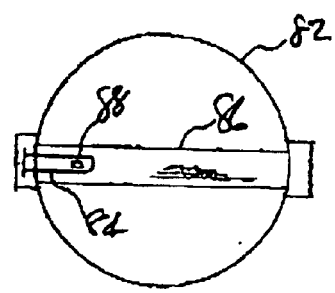
FIG. 13 is a cross-sectional view taken along the line 13—13 of FIG. 12.

In an alternative orientation of the monitor and the light sources, shown in FIGS. 12 and 13, the axes of actinometric monitors 84 are arranged to be parallel with and between the axes of respective light sources 86. Moreover, the axes of actinometric monitors 84 lie in a plane that contains the axes of respective light sources 86. In that arrangement the light impinges directly against the respective windows 88 carried by actinometric monitors 84, rather than at an incidence angle as in the arrangement shown in FIGS. 10 and 11.

Figure 14:
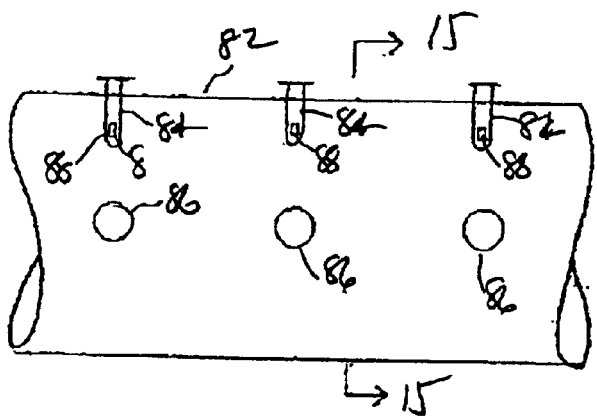
FIG. 14 is a fragmentary view similar to that of FIG. 10 showing a further positional arrangement of actinometric monitors relative to the light sources.
Figure 15:
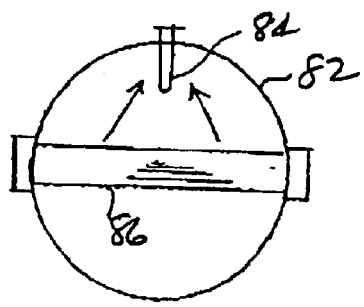
FIG. 15 is a cross-sectional view taken along the line 15—15 of FIG. 14.

In another alternative orientation of the monitor and the light sources, shown in FIGS. 14 and 15, actinometric monitors 84 are positioned so that their axes pass through the pipeline centerline and are perpendicular to a plane in which the axes of tubular light sources 86 lie. Instead of being positioned between the respective light sources, as in the orientation shown in FIGS. 10 and 11, actinometric monitors 84 are oriented so that each actinometric monitor is opposite a light source 86 and the axis of each actinometric monitor 84 is perpendicular to and passes through the axis of the adjacent light source 86.

A further embodiment of an actinometric monitor is shown in FIGS. 16 through 18. In that embodiment, an ultraviolet-sensing device in the form of a holder 90 is provided. Holder 90 can be configured to conform with European standards (e.g., German Standard DVGW W 294) for photocell-based ultraviolet light sensors for use in water treatment systems, and can be provided in cylindrical form, as shown, including a cylindrical body 92 and a cylindrical end member 94. Holder 90 is received within a tubular sleeve 95 that extends outwardly from reactor wall 100, and can be metallic, to provide a structure that is opaque to the passage of light. End wall 96 of cylindrical body 92 lies against the surface of a transparent window 98 provided in wall 100.

Window 98, which is encircled by tubular sleeve 95, can be a quartz window, preferably one having a high transparency to ultraviolet light. Window 98 allows light to pass from the light source, which can be a tubular ultraviolet lamp 112, into and through a cylindrical central passageway 102 of holder 90, to impinge against a photocell-containing unit 104. The photocell (not shown) is operatively connected with a suitable sensing circuit (not shown), to display or to otherwise monitor ultraviolet light irradiance as sensed by the photocell. Photocell unit 104 is received in a suitably-shaped central recess 106 provided in the outer end of end member 94.

In accordance with the present invention, known holder 90 is modified to receive a container (not shown) for an actinometric solution. The container can be configured to be of the same size and shape as tubular container 54 shown in FIG. 2. Holder 90 is modified by providing a transversely-extending passageway 108 in the sidewall of end member 94, and a correspondingly-shaped blind bore 110 is provided in the inner surface of recess 106 of end member 94, diametrically opposite from and in axial alignment with passageway 108, to allow a container or cuvette having a corresponding cross-sectional shape to be slidably inserted laterally into end member 94. Light that passes through window 98 from lamp 112 enters passageway 102 and passes through the container sidewall to impinge upon an actinometric solution within the container, in a manner similar to that for the embodiment shown in FIGS. 1 through 7. Consequently, a determination can be made of the actual light irradiance emanating from lamp 112 by placing the container in a spectrophotometer. The spectrophotometer can measure the absorbance change of the actinometric solution from an unexposed initial condition to the exposed condition. As shown, passageway 108 and blind bore 110 can have a square cross section, although other cross sections can also be provided to correspond with the cross-sectional shape of the container.

In operation of the embodiment of FIGS. 16 through 18, an actinometric-solution-containing container or cuvette is utilized to periodically recalibrate the photocell by means of a correlation curve (not shown) that was previously established. The correlation curve provides a correlation between the absorbance change of the actinometric solution and the irradiance from lamp 112. In that manner, the accuracy of the photocell can be monitored by periodically comparing the photocell output reading with the irradiance value derived from the correlation curve based upon the absorbance change of the actinometric solution. Suitable adjustments can thus be made to account for changes in photocell sensitivity, so that the photocell output can be utilized in connection with the desired control of the operation of the ultraviolet-light reactor. When utilizing an actinometric-solution-containing cuvette, an opaque cover 114 is provided to block extraneous ambient light from the actinometric solution.

The embodiment of the invention as shown in FIGS. 1 through 8, enables the actinometric-solution-containing cuvette and photocell to be positioned closer to the light source than in the embodiment shown in FIGS. 16 through 18, to thereby provide more precise measurements of ultraviolet lamp output irradiance. The embodiment of the invention as shown in FIGS. 16 through 18, however, permits the actinometric monitor to be utilized in applications in which a monitoring window is placed flush with the reactor wall, so as not to extend into a flow stream, to avoid affecting the flow of liquid through the reactor. In each embodiment, however, the disclosed holder enables the recalibration of a photocell sensor based upon the results of actinometric measurements obtained from a more precise, actinometric-solution-based sensor.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. An actinometric monitor for measuring ultraviolet irradiance in a water disinfection ultraviolet reactor that includes an interiorly-positioned ultraviolet light source, said monitor comprising:
   a. a holder for selectively receiving one of a photocell-based ultraviolet light sensor having a surface positioned at a predetermined distance from the light source and an actinometric-solution-based ultraviolet light sensor having a surface positioned from the light source at the predetermined distance, wherein the holder is adapted to be removably positioned in a holder sleeve extending outwardly from a wall of the reactor;
   b. a window that is substantially transparent to ultraviolet light and positioned between the light source and the holder to prevent contact between the holder and liquid to be treated by exposure to ultraviolet light within the reactor; and
   c. a recess provided in the holder and positioned at a predetermined distance from the light source for removably receiving an actinometric-solution-containing cuvette.

2. A monitor in accordance with claim 1, including
   a. a closed-end tubular sleeve extending inwardly from an outer wall of the reactor and terminating at a predetermined distance from the light source, wherein at least an innermost end of the sleeve is transparent to ultraviolet light;
   b. a sample cell holder for insertion into and removal from said tubular sleeve;
   c. a sample cell that is transparent to ultraviolet light for containing an actinometric solution;
   d. means to removably attach the sample cell to the sample cell holder such that the sample cell can be inserted into the tubular sleeve and suspended therewithin at a predetermined distance from an ultraviolet light source within the reactor; and
   e. means for removing the sample cell holder from the tubular sleeve after a predetermined ultraviolet exposure time interval.

3. A monitor in accordance with claim 2, wherein the tubular sleeve includes a closed-end quartz member at its innermost end to allow transmission therethrough of ultraviolet light.

4. A monitor in accordance with claim 2, wherein the sample cell holder includes a recessed, tapered opening for receiving the means for attaching the sample cell.

5. A monitor in accordance with claim 2, wherein the sample cell holder includes a lateral projection for engaging the housing to limit inward movement of the sample cell holder relative to the housing.

6. A monitor in accordance with claim 2, including a gripping member carried by the sample cell holder for removing the sample cell holder from the tubular sleeve.

7. A monitor in accordance with claim 2, including at least one marking carried by the tubular sleeve for orienting the sample cell holder in predetermined relationship with the housing.

8. A monitor in accordance with claim 2, wherein the sample cell is a quartz container having a substantially rectangular cross section.

9. A monitor in accordance with claim 8, wherein the sample cell includes a cover for blocking ultraviolet light, the cover including a pair of openings on respective opposite sides of the cell to allow the passage therethrough of ultraviolet light.

10. A monitor in accordance with claim 9, wherein the cover is an opaque tape applied to the sample cell.

11. A monitor in accordance with claim 9, wherein the cover is an opaque coating applied to the sample cell.

12. A monitor in accordance with claim 2, wherein the means to removably attach the sample cell to the sample cell holder is a resilient flexible sleeve.

13. A monitor in accordance with claim 2, including an adapter sleeve carried between the tubular sleeve and the holder.

14. A monitor in accordance with claim 2, wherein the sample cell holder is placed parallel to and between adjacent ultraviolet light sources.

15. A monitor in accordance with claim 2, wherein the sample cell holder is placed perpendicular to and between adjacent ultraviolet light sources.

16. A monitor in accordance with claim 2, wherein the sample cell holder is placed perpendicular to and directly opposite an ultraviolet light source.

17. A monitor in accordance with claim 2, wherein an opening of a sample cell is positioned to receive ultraviolet light from a designated ultraviolet light source within the reactor to determine changes in ultraviolet light output over time for that designated light source.

* * * * *